US011168820B2

(12) United States Patent
Olausson et al.

(10) Patent No.: US 11,168,820 B2
(45) Date of Patent: Nov. 9, 2021

(54) ASSEMBLY OF A COUPLING AND A STIFF TUBE AND METHOD THEREFORE

(71) Applicant: CEJN AB, Skövde (SE)

(72) Inventors: Jonas Olausson, Skövde (SE); Jonas Eriksson, Skövde (SE)

(73) Assignee: CEJN AB, Skövde (SE)

( * ) Notice: Subject to any disclaimer, the term of this patent is extended or adjusted under 35 U.S.C. 154(b) by 128 days.

(21) Appl. No.: 16/738,365

(22) Filed: Jan. 9, 2020

(65) Prior Publication Data

US 2020/0224806 A1 Jul. 16, 2020

(30) Foreign Application Priority Data

Jan. 14, 2019 (GB) .................................... 1900475

(51) Int. Cl.
*F16L 37/50* (2006.01)
*F16L 27/12* (2006.01)
*F16L 37/096* (2006.01)

(52) U.S. Cl.
CPC ............ *F16L 37/096* (2013.01); *F16L 27/12* (2013.01); *F16L 27/1273* (2019.08); *F16L 37/505* (2013.01)

(58) Field of Classification Search
CPC ...... F16L 27/12; F16L 27/1273; F16L 37/505
See application file for complete search history.

(56) References Cited

U.S. PATENT DOCUMENTS 799,954 A * 9/1905 Vanderman ............ F16L 27/12 285/31
1,853,411 A * 4/1932 Gentry ............... F16L 27/1274 285/342
1,926,003 A * 9/1933 Hall ....................... F16L 27/12 285/14
2,912,262 A 11/1959 Franck
3,773,360 A * 11/1973 Timbers ............... F16L 37/088 285/307
4,776,617 A 10/1988 Sato
4,808,117 A * 2/1989 Gale ...................... F16L 25/01 439/192
4,932,686 A 6/1990 Anderson, Jr.
5,403,046 A * 4/1995 Kooten .................. F16L 27/12 285/319
8,215,678 B2 * 7/2012 Peachey ............. F16L 27/1017 285/302

(Continued)

*Primary Examiner* — Matthew Troutman
*Assistant Examiner* — Alexander T Rufrano
(74) *Attorney, Agent, or Firm* — Lando & Anastasi, LLP

(57) ABSTRACT

An assembly of a male coupling part 200 and a stiff tube 100 is disclosed, the stiff tube 100 having an attachment means 110; and the male coupling part 200 requiring a relative axial displacement between the male coupling part 200 and the stiff tube 100 for connecting to a female coupling part 500, the male coupling part 200 comprising an axial through opening 210. The Assembly further comprises an element 300 detachably connected to the male coupling part 200 and slidably attached to the stiff tube 100, the element 300 having an opening 310 allowing relative axial displacement 340 between the male coupling part 200 and the stiff tube 100, and the attachment means 110 being movable within the opening 310. A method for coupling and un-coupling the assembly to a female coupling part is also disclosed.

14 Claims, 3 Drawing Sheets

400
340
350
100
110
300
310
200
210

(56) References Cited

U.S. PATENT DOCUMENTS

| | | | | |
|---|---|---|---|---|
| 8,764,066 | B1 * | 7/2014 | Rice | F16L 27/12 285/302 |
| 9,664,318 | B2 * | 5/2017 | Crompton | F16L 5/00 |
| 9,765,912 | B2 * | 9/2017 | Spears | F16L 27/12 |
| 2008/0106092 | A1 | 5/2008 | Klein et al. | |

* cited by examiner

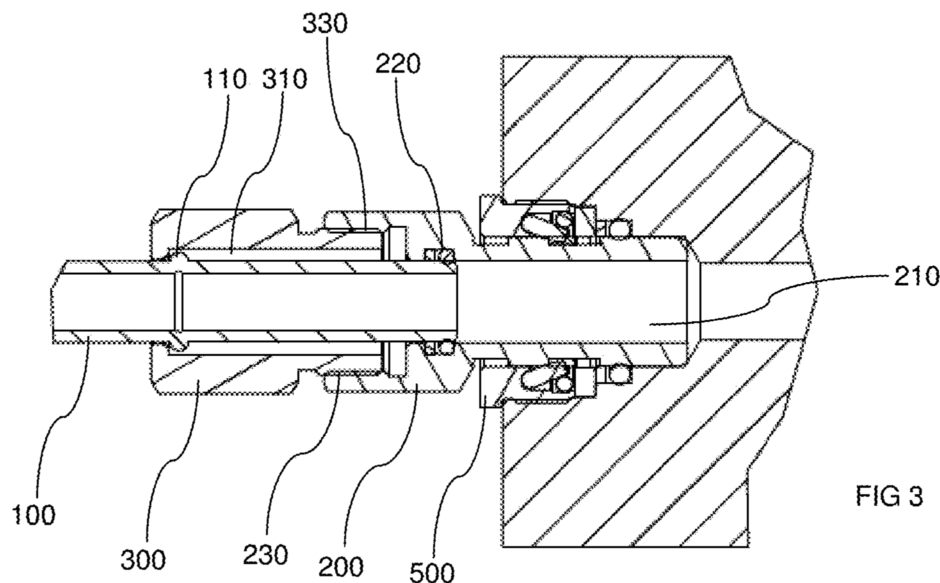
FIG 3
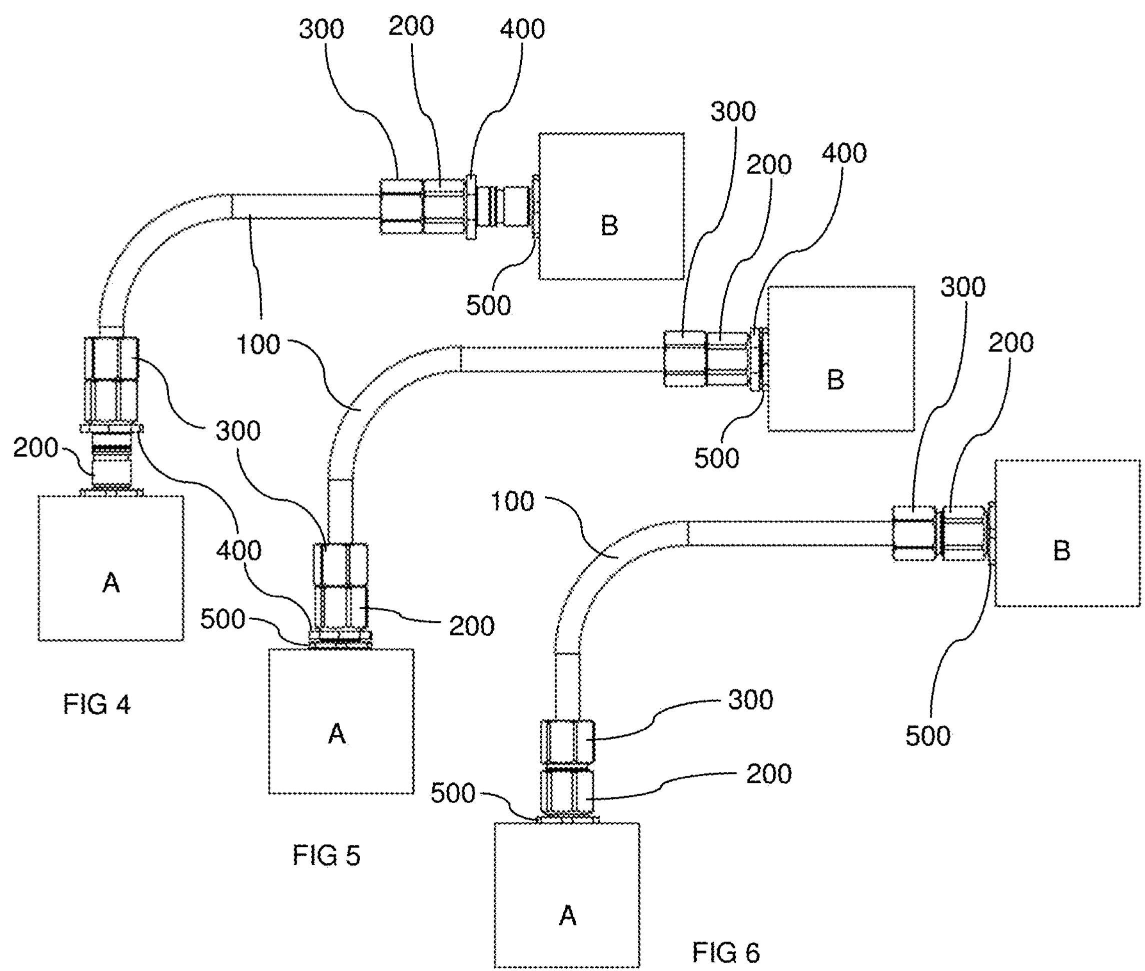
FIG 4
FIG 5
FIG 6

ASSEMBLY OF A COUPLING AND A STIFF TUBE AND METHOD THEREFORE

TECHNICAL FIELD

The present disclosure relates to an assembly for a coupling and a stiff tube, and a method for coupling and un-coupling such an assembly. More particularly, the assembly relates to a stiff, rigid, tube having at one end, or both ends, a male coupling part, the male coupling part requiring relative axial displacement between the stiff tube and the male coupling part, so that the male coupling part can be connected to a female coupling part, and a method for coupling and un-coupling such a male coupling part.

BACKGROUND

In many situations in the industry stiff tubes are used instead of flexible tubes. The use of non-flexible tubes is often required. This leads to a problem when the coupling used for the stiff tube, the non-flexible tube, requires an axial displacement to be able to be connected. In many situations in the industry the stiff tube can not be moved, or bent, to give room, or flexibility, for such an axial displacement. It is thus a problem how to connect a female coupling part with a male coupling part requiring a relative axial displacement between the male coupling part and a stiff tube. It is further a problem how to realise this with a straight, or bent, stiff tube with a male coupling part at one, or each, end.

Connectors with stiff tubes must be able to be used with existing couplings, such as nipples and couplings that already exist. The way that the stiff tube is connected must be done in an easy and convenient way. If it is too complicated and too cumbersome to use, then it will not be used by the industry. The connection must also be safe. If it is not safe and fulfils all legal requirements, then it will not be used by the industry.

It is desirable to provide an assembly that can overcome the above mentioned problems, but that is also inexpensive to manufacture, is easy to manufacture, for example extra manufacturing steps must be avoided, and is robust. The coupling must also fit to existing coupling parts. The coupling must also be able to be installed in the industry where non-flexible tubes are required. The connection must be easily and safely done. The present disclosure is directed to overcoming one or more of the problems as set forth above.

SUMMARY OF THE INVENTION

It is an object of the present invention to provide an assembly of a male coupling part and a stiff tube, and a method for coupling and un-coupling such an assembly. This object can be achieved by the features as defined by the independent claim. Further enhancements are characterised by the dependent claims.

According to one embodiment, an assembly of a male coupling part 200 and a stiff tube 100 comprises the stiff tube 100 having an attachment means 110; and the male coupling part 200 requiring a relative axial displacement between the male coupling part 200 and the stiff tube 100 for connecting to a female coupling part 500, the male coupling part 200 comprising an axial through opening 210. The Assembly further comprises an element 300 detachably connected to the male coupling part 200 and slidably attached to the stiff tube 100, the element 300 having an opening 310 allowing relative axial displacement 340 between the male coupling part 200 and the stiff tube 100, and the attachment means 110 being movable within the opening 310.

According to one embodiment, the assembly may further comprise that the opening 310 of the element 300 is circumferentially around the stiff tube 100, and an axial length 340 of the opening corresponds, at least, to the relative axial displacement of the male coupling part 200.

According to one embodiment, the assembly may further comprise that the detachably connection is made with a screw connection 230, 330, and the screw connection 230, 330, allows, at least, a further relative axial displacement 350 between the stiff tube 100 and the male coupling part 200. Preferably, a first thread 230 of the screw connection on the male coupling part 200 and a second thread 330 of the screw connection on the element 300 have each a section free of thread before and/or after the first thread 230 and the second thread 330.

According to one embodiment, the assembly may further comprise that the attachment means 110 is a circumferential extension around the stiff tube extending radially within the opening 310. According to one embodiment, the assembly may further comprise that the male coupling part 200 comprises a sealing element 220 arranged in the axial through opening 210, the sealing element 220 being in contact with the stiff tube 100. Preferably, the male coupling part 200 comprises a circumferential axial groove 240, and a ring 242 slidably around and inside the circumferential axial groove 240. This is preferred because such a male coupling part requires a relative axial displacement between the male coupling part 200 and the stiff tube 100 for connecting and disconnecting to a female coupling part 500.

According to one embodiment, the assembly may further comprise that the male coupling part (200) comprises a removable stop (400) attachable to the outside of the male coupling part (200). This is preferred because such a male coupling part requires a relative axial displacement between the male coupling part 200 and the stiff tube 100 for connecting and disconnecting to a female coupling part 500.

According to one embodiment, the assembly may further comprise that the element 300 is axially slidably on the stiff tube 100 between an end of the male coupling part 200 and a flange 320 of the element 300. According to one embodiment, the assembly may further comprise a second attachment means 110, a second male coupling part 200, and a second element 300 correspondingly arranged on the opposite end of the stiff tube 100.

According to one embodiment, a method for coupling and un-coupling the assembly according to any one of the preceding embodiments to a female coupling part is disclosed. The method comprises coupling by sliding the male coupling part 200 and the element 300 relative to the stiff tube 100 until the attachment means 110 contacts the end of the male coupling part; and inserting the male coupling part 200 into the female coupling part 500 while not axially moving the stiff tube. The method comprises un-coupling by axially move the male coupling part 200 further into the female coupling part 500 while the element 300 is axially stationary with the stiff tube 100; and removing the assembly by sliding the male coupling part 200 and the element 300 relative to the stiff tube 100 until the attachment means 110 contacts the end of the male coupling part 200.

According to one embodiment, the method may further comprise that the first step of un-coupling is to remove a stop 400 to allow the male coupling part 200 to be inserted further into the female coupling part 500.

According to one embodiment, the method may further comprise that the step of axially moving the male coupling part 200 further into the female coupling part 500 while the element 300 is axially stationary with the stiff tube 100, further comprises rotating the male coupling part 200 relatively to the element 300. Preferably, the step of removing the assembly by sliding the male coupling part 200 and the element 300 relative to the stiff tube 100 until the attachment means 110 contacts the end of the male coupling part 200, further comprises rotating the male coupling part 200 relatively to the element 300.

According to one embodiment, the method may further comprise that the coupling or the un-coupling is done for a stiff tube 100 with an attachment means 110, a male coupling part 200, and an element 300 at each side of the stiff tube 100.

At least one of the above embodiments provides one or more solutions to using stiff tubes, non-flexible tubes, in the industry. Solutions are provided for the problem when the coupling used for the stiff tube, the non-flexible tube, requires an axial displacement to be able to be connected. One or more solutions are provided for how to connect a female coupling part with a male coupling part requiring a relative axial displacement between the male coupling part and a stiff tube, even for a straight, or bent, stiff tube with a male coupling part at each end.

At least one of the above embodiments provides one or more solutions to be able to use connectors with stiff tubes with existing couplings, such as nipples and couplings that already exist. The way that the stiff tube is connected is done in an easy and convenient way. The assembly and method is straight forward and simple to use, and the connection is safe.

At least one of the above embodiments overcome the above mentioned problems, and is also inexpensive to manufacture, is easy to manufacture, and is robust. The coupling fits to existing coupling parts because no changes are made to the parts of the nipple and the coupling. The coupling can be installed in the industry where non-flexible tubes are required. The connection is easily and safely done.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed or described embodiment may be technically combined with any other claimed or described embodiment(s).

BRIEF DESCRIPTION OF THE DRAWINGS

The accompanying drawings illustrate presently exemplary embodiments of the disclosure, and together with the general description given above and the detailed description of the embodiments given below, serve to explain, by way of example, the principles of the disclosure.

FIG. 3 is a diagrammatic illustration of an assembly according to an exemplary embodiment of the present disclosure, here the male coupling part is in the process of being disconnected;

FIG. 4 is a diagrammatic illustration of an assembly according to an exemplary embodiment of the present disclosure;

FIG. 5 is a diagrammatic illustration of an assembly according to an exemplary embodiment of the present disclosure;

FIG. 6 is a diagrammatic illustration of an assembly according to an exemplary embodiment of the present disclosure;

DETAILED DESCRIPTION

Figure 1:
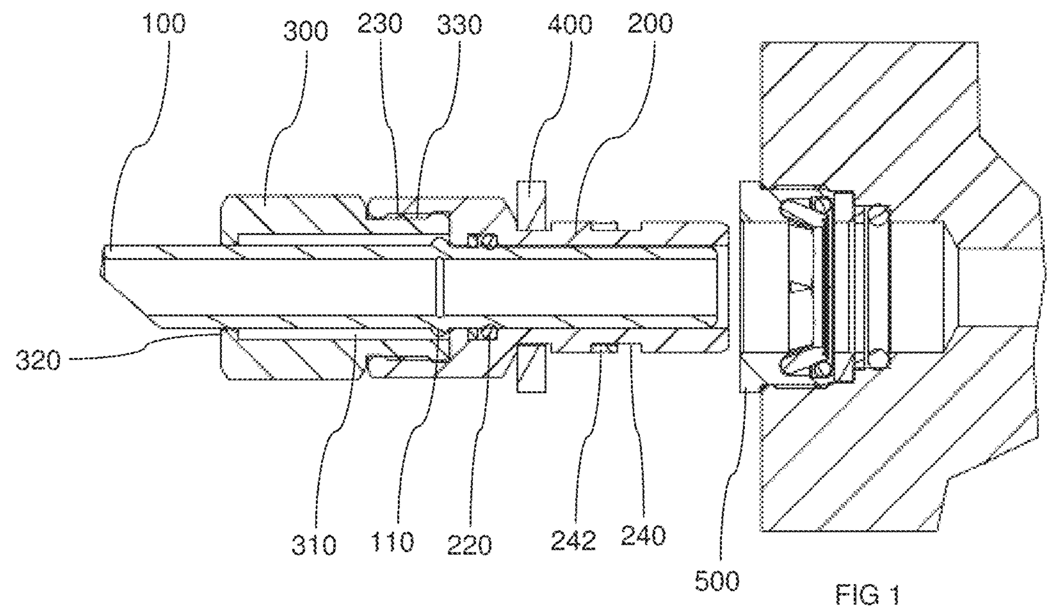
FIG. 1 is a diagrammatic illustration of an assembly according to an exemplary embodiment of the present disclosure, here the male coupling part is not connected.
Figure 2:
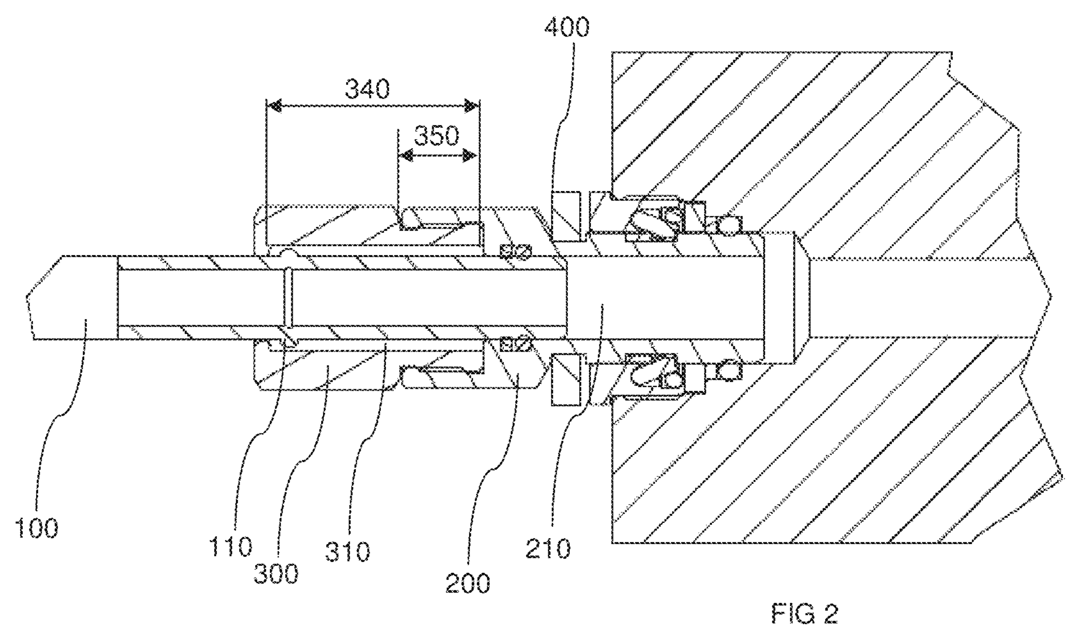
FIG. 2 is a diagrammatic illustration of an assembly according to an exemplary embodiment of the present disclosure, here the male coupling part is connected.

FIGS. 1 to 3 are diagrammatic illustrations of a stiff tube 100, a male coupling part 200, an element 300, a stop 400, and a female coupling part 500 according to an exemplary embodiment of the present disclosure. The female coupling part 500 has been illustrated merely for more easily understanding this disclosure, and is not part of the invention. In the industry the male coupling part 200 is often called nipple, and the female coupling part 500 is often called coupling.

According to one embodiment, an assembly of a male coupling part (200) and a stiff tube (100), comprises the stiff tube (100) having an attachment means (110); and the male coupling part (200) requiring a relative axial displacement between the male coupling part (200) and the stiff tube (100) for connecting to a female coupling part (500), the male coupling part (200) comprising an axial through opening (210). An element (300) is detachably connected to the male coupling part (200) and slidably attached to the stiff tube (100), the element (300) having an opening (310) allowing relative axial displacement (340) between the male coupling part (200) and the stiff tube (100), and the attachment means (110) being movable within the opening (310).

The stiff tube 100 may be a rigid tube, a non-flexible tube. The stiff tube 100 that may not be easily bent by hand force. The stiff tube 100 may be damaged if it is bent and/or lose its function. A stiff tube 100 may not be manufactured for being bent. A stiff tube 100 may be the opposite of a flexible tube. The stiff tube 100 has an attachment means 110. The attachment means 110 may be a circumferential extension. The circumferential extension may be extending radially from the stiff tube. The circumferential extension may be uniform, homogeneous, with the stiff tube 100, be made from the stiff tube 100 itself by deformation, thus being of the same material as the stiff tube 100. The circumferential extension may be used for attaching the male coupling part 200 to the stiff tube 100 via the element 300. The stiff tube may be a round tube.

The male coupling part 200 requires a relative axial displacement between the stiff tube 100 and the male coupling part 200 for connecting and disconnecting the male coupling part 200 from the female coupling part 500. Naturally the male coupling part 200 also need the same relative axial displacement between the male coupling part 200 and the female coupling part 500 for connecting or disconnecting. In other words, the stiff tube 100 is a certain close fixed distance from the female coupling part 500. For connecting the male coupling part 200 is pushed into the female coupling part 500, and the stiff tube 100 is stationary. The connected state is illustrated in FIG. 2. For disconnecting the male coupling part 200 is first pushed further into the female coupling part 500, see FIG. 3, and then subsequently pulled out of the female coupling part 500. The male coupling part 200 comprising an axial through opening 210 for allowing fluid to pass through the stiff tube 100, the male coupling part 200, and the female coupling part 500. The axial trough opening 210 may have the same, or substantially the same, inner diameter as the outer diameter of the stiff tube 100. This allows the stiff tube 100 to neatly fit inside the axial through opening 210 of the male coupling part 200, and also to engage a seal 220 inside the axial through opening 210.

The element 300 may be a stiff tube element, a kind of nipple-tube adaptor. The element 300 is connectably attached, detachably connected, to the male coupling part 200 and is slidably attached to the stiff tube 100, preferably at one end of the stiff tube 100, or at both ends of the stiff tube 100 in case of having two elements 300. Thus, the element 300 allows the connection, and disconnection, of the male coupling part 200 to the stiff tube 100. The element 300 has an opening 310 allowing relative axial displacement between the male coupling part 200 and the stiff tube 100. The stiff tube 100 may be at all time completely within the opening 310. The element 300 may be cylindrical in shape. The opening 310 may extend axially around the stiff tube 100. The opening 310 allows the attachment means 110 of the stiff tube 100 to be movably within the opening 310. In this way the attachment means 110 is movably arranged, and limited, within the opening 310. This allows for the relative axial movement between the stiff tube 100 and the element 300, and the male coupling part 200 because it is connected to the element 300.

According to one embodiment, the opening 310 of the element 300 may be circumferentially around the stiff tube 100. The opening 310 may be circumferentially all around the stiff tube 100. An axial length 340 of the opening 310 may correspond, at least to, substantially to, the relative axial displacement of the male coupling part. The axial length may be at least equal to the necessary relative axial displacement of the male coupling part 200 for connecting the male coupling part 200 with the female coupling part 500. The axial length may not extend further, i.e. the further axial displacement as explained in the next paragraph is not part of the axial length 340. The axial length 340 is thus at least the relative axial displacement of the male coupling part 200; and may depend on the configuration of the male coupling part 200. The axial length 340 may be at least equal to, preferably slightly longer than, the length of the male coupling part 200 from the end (the end that is inserted into the female coupling part 500) to the stop 400, or shortly before the stop (the stop preventing further insertion into the female coupling part 500). This is the first axial insertion of the male coupling part 200 for coupling the male coupling part 200 with the female coupling part 500.

According to one embodiment, the detachably connection may be made with a screw connection 230 and 330. The male coupling part 200 may have a first screw thread 230 facing radially inwards, and the element 300 may have a second screw thread 330 facing radially outwards. The screw connection 230 and 330 allows for a further axial displacement 350 between the stiff tube 100 and the male coupling part 200. This further axial displacement allows for a further insertion of the male coupling part 200 into the female coupling part 500, for disconnecting, un-coupling, the male coupling part 200 from the female coupling part 500. How the un-coupling is done is also further explained below with reference to the method of un-coupling. The combination of the relative axial displacement and the further axial displacement is important, because it allows for coupling and un-coupling, connecting and dis-connecting, the male coupling part 200 and the female coupling part 500, respectively. The relative axial displacement is used for connecting, and the subsequent further axial displacement, the screw connection, is used for disconnecting. Naturally the relative axial displacement is also used for disconnecting, because it allows for the male coupling part 200 to be pulled out of the female coupling part 500. It is thus the combination of first the further axial displacement and then the relative axial displacement that allows for the disconnection.

According to one embodiment, the assembly may comprise a first thread 230 of the screw connection on the male coupling part 200 and a second thread 330 of the screw connection on the element 300. Each thread may have a section free of thread before and/or after the first thread 230 and the second thread 330. This allows for good fitting and flexibility to adjust to the coupling and un-coupling, and protects the threads. A different connection than a screw connection could be made, for example a clamp connection, a snap connection, bayonet connection, etc.

According to one embodiment, the attachment means 110 may be a circumferential extension 110 around the stiff tube 100 extending radially within the opening 310 of the element 300. The circumferential extension 110 may be extending radially from the stiff tube. The circumferential extension may be uniform, homogenous, with the stiff tube 100, be made from the stiff tube 100 itself by deformation, thus being of the same material as the stiff tube 100. The attachment means need not to be circumferential and, for example, two, three, four, or five single non-circumferential extensions may be used. The circumferential extension may be used for attaching the male coupling part 200 to the stiff tube 100 via the element 300. The circumferential extension 110 may be a semi-circular radial extension from a wall of the stiff tube when looking at a cut through the stiff tube 100 as illustrated for example in FIGS. 1-3. The circumferential extension 110 may extend radially between half to full thickness of the wall of the stiff tube 100. A circumferential extension 110 allows for a good, safe and easy connection of the element 300 to the stiff tube 100.

According to one embodiment, wherein the male coupling part 200 may have a sealing element 220 arranged in the axial through opening 210. The sealing element 220 may be an o-ring or any other sealing element such as, for example, an X-ring or square seal. The sealing element may be supported by an anti-extrusion back-up ring. The sealing element 220 may be in contact with the stiff tube 100 during coupling and un-coupling. Therefore, the sealing element 220 may be arranged close to the end of the male coupling part 200 facing away from the end of the stiff tube 100. This ensures safety and that no fluid is leaked.

According to one embodiment, the male coupling part 200 may have a circumferential axial groove 240, and may have a ring 242 slidably around and inside the circumferential axial groove. The ring 242 may have the same thickness, in the radial direction, as the depth, in the radial direction, of the groove 240. This allows the locking mechanism of the female coupling part 500 to disconnect when the male coupling part 200 is pushed the further axial displacement into the female coupling part 500. This is an important embodiment, because this kind of male coupling part 200 with the groove 240 and the ring 242, for example a WEO nipple, requires and axial displacement both forwards and backwards in relation to the stiff tube 100 and the female coupling part 500. The male coupling part 200 may be a WEO nipple. Thus, any one embodiment disclosed herein is very suitable for this kind of male coupling part 200.

According to one embodiment, the male coupling part 200 may have a removable stop 400 attachable to the outside of the male coupling part 200. The removable stop 400 may be detachably connected to the male coupling part 200. When connected, the removable stop 400 prevents the male coupling part 200 to be pushed further into the female coupling part 500 to be disconnected. When not connected, the removable stop 400 allows the male coupling part 200 to be pushed further into the female coupling part 500 to be disconnected.

According to one embodiment, the element 300 is axially slidably arranged on the stiff tube 100 between an end of the male coupling part 200 and a flange 320 of the element 300. The attachment means 110 may be arranged within the opening 310 to slide axially with axial stops between an end of the male coupling part 200 and a flange 320, a radially inverted flange 320, preferably at the end opposite the male coupling part 200 of the element 300.

According to one embodiment, the assembly may further comprise a second attachment means, a second male coupling part, and a second element correspondingly arranged on the opposite end of the stiff tube. This is thus an embodiment with a stiff tube with one male coupling part at each end. This is illustrated in FIGS. 4 to 6. This allows a stiff tube 100 to be connected between two stationary female coupling parts.

Figure 7:
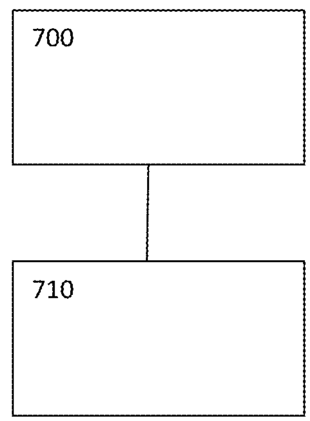
FIG. 7 shows a diagrammatic illustration of a method for coupling an assembly according to an exemplary embodiment of the present disclosure.
Figure 8:
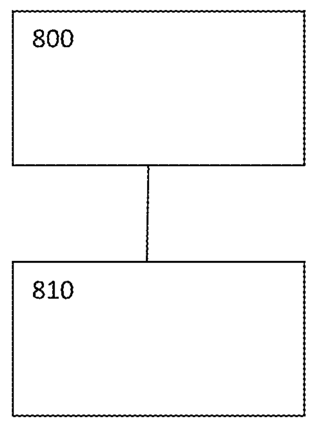
FIG. 8 shows a diagrammatic illustration of a method for un-coupling an assembly according to an exemplary embodiment of the present disclosure.

According to one embodiment, a method for coupling and un-coupling, connecting and disconnecting, the assembly according to any one of the preceding embodiment, or combinations thereof, to a female coupling part 500, is disclosed. The method comprises coupling and un-coupling the male coupling part 200. The method of coupling is illustrated by FIG. 7 and the method of un-coupling is illustrated by FIG. 8.

Coupling of the assembly to a female coupling part 500 is done by at least the following, preferably in order. Sliding 700 the male coupling part 200 and the element 300 relative to the stiff tube 100 until the attachment means 110 contacts the end of the male coupling part. This position is illustrated by FIGS. 1 and 4. In this position the stiff tube 100 is inserted into the axial through opening 210, substantially all of the male coupling part 200 takes up the stiff tube 100. The axial through opening 210 is substantially filled with the stiff tube 100. From this position the following can be done. Inserting 710 the male coupling part 200 into the female coupling part 500 while not axially moving the stiff tube 100. This position is illustrated by FIGS. 2 and 5. Here the male coupling part 200 is moved axially away from the stiff tube 100. During these two steps the sealing means 220 is constantly in contact with the stiff tube 100. These two steps are illustrated by FIG. 7.

Un-coupling of the assembly to a female coupling part 500 is done by at least the following, preferably in order. Axially move 800 the male coupling part 200 further into the female coupling part 500 while the element 300 is axially stationary with the stiff tube 100. This position is illustrated by FIG. 3. Here the male coupling part 200 has been further inserted by the further axial displacement into the female coupling part 500 to allow the locking mechanism of the female coupling part 500 to be lifted up by the ring 242. In this position the flange 320 of the element 300 may be in contact with the attachment means 110. After this the following is done. Removing 810 the assembly by sliding the male coupling part 200 and the element 300 relative to the stiff tube 100 until the attachment means 110 contacts the end of the male coupling part 200. This position is illustrated by FIG. 1. In this position as much as possible of the stiff tube 100 is within the axial through opening 210 of the male coupling part 200. These two steps are illustrated by FIG. 8.

According to one embodiment, the method may further comprise the following step. Preferably, this step is taken as the first step of un-coupling, thus taken before 800 axially moving the male coupling part 200. The first step of un-coupling may be to remove the stop 400 to allow the male coupling part 200 to be inserted further into the female coupling part 500. This is illustrated in FIG. 3 where the stop 400 has been removed so that the male coupling part 200 can be fully inserted into the female coupling part 500.

According to one embodiment, the method may further comprise the following. Preferably, this may be made at the same time as 800 axially moving the male coupling part 200. The step of axially moving the male coupling further into the female coupling while the element is axially stationary with the stiff tube, may further comprise rotating the male coupling part 200 relatively to the element 300. Such rotation may be to screw the first thread 230 of the screw connection on the male coupling part 200 relative to the second thread 330 of the screw connection on the element 300, thus screwing the male coupling part 200 away from the element 300. This allows for the further axial displacement 350 of the male coupling part 200 into the female coupling part 500 to initiate disconnecting the two.

According to one embodiment, the method may further comprise the following. Preferably, this may be made at the same time as 810 removing the assembly. The step 810 of removing the assembly by sliding the male coupling part 200 and the element 300 relative to the stiff tube 100 until the attachment means 110 contacts the end of the male coupling part 200, may further comprise rotating the male coupling part 200 relatively to the element 300. Such rotation may be to screw the first thread 230 of the screw connection on the male coupling part 200 relative to the second thread 330 of the screw connection on the element 300, thus screwing the male coupling part 200 towards the element 300. This allows for the further axial displacement 350 to connect fully the male coupling part 200 with the female coupling part 500.

According to one embodiment, the method may further comprise that the coupling, or the un-coupling, is done for a stiff tube 100 with an attachment means 110, a male coupling part 200, and an element 300 at each side of the stiff tube 100. One embodiment of this is illustrated in FIGS. 4 to 6 where the stiff tube 100 comprises an angle of about 90 degrees. Each end of the stiff tube 100 may have an attachment means 110 according to any of the above embodiments, with a male coupling part 200 and an element 300. In this way a stiff tube 100 can be connected between two solid objects.

According to the three embodiments illustrated in FIGS. 4 to 6, a stiff tube 100 having a 90-degree angle is disconnected in FIG. 4, connected in FIG. 5, and in the process of being disconnected in FIG. 6, from two objects A and B. One or both of the two objects may be, for example, a machine part or any other piece of industrial equipment where a stiff tube needs to be connected. The objects A and B may not be able to be moved relative to each other and/or relative to the stiff tube 100.

According to the embodiment illustrated by FIG. 4 the male coupling part 200 is outside of the female coupling part 500 of both the objects A and B. This position is also illustrated in FIG. 1. Thus, as explained above, the end of the stiff tube 100 substantially fills the axial trough opening 210 of the male coupling part 200. This allows each of the male coupling parts 200 to be placed before the opening of each female coupling part 500.

According to the embodiment illustrated by FIG. 5 the male coupling part 200 is inside of the female coupling part 500 of both the objects A and B. Thus, as explained above, the element 300 and the male coupling part 200 have been moved the relative axial displacement to connect the male coupling part 200 with the female coupling part 500. This position is also illustrated in FIG. 2. Each stop 400 prevents that the male coupling part 200 is further pushed into the female coupling part 500 for un-coupling.

According to the embodiment illustrated by FIG. 6 each stop 400 has been removed and the male coupling part 200 has been further pushed into the female coupling part 500 of both the objects A and B. This position is also illustrated in FIG. 3. Thus, as explained above, the male coupling part 200 is unscrewed from the element 300 to allow the further relative axial displacement. This allows for the locking element of each female coupling part 500 to be lifted up by the ring 242 so that the male coupling part 200 can be removed from the female coupling part 500.

It will be apparent to those skilled in the art that various modifications and variations can be made to the embodiments disclosed above. Other embodiments will be apparent to those skilled in the art from consideration of the specification and practice of the disclosed junction box, connector, and methods. It is intended that the specification and examples be considered as exemplary only, with a true scope being indicated by the following claims and their equivalents.

LIST OF ELEMENTS

100 stiff tube
110 attachment means
200 male coupling part
210 axial through opening
220 sealing means
230 first thread
240 groove
242 ring
300 element
310 opening
320 flange
330 second thread
340 axial length (of the opening 310)
350 further axial displacement
400 stop
500 female coupling part
700 method step
710 method step
810 method step
820 method step

The invention claimed is:

1. An assembly of a male coupling part and a stiff tube, the assembly comprising:
- the stiff tube having an attachment means;
- the male coupling part requiring a relative axial displacement between the male coupling part and the stiff tube for connecting to a female coupling part, the male coupling part comprising an axial through opening and a removable stop attachable to the outside of the male coupling part, and wherein the male coupling part comprises a sealing element arranged in the axial through opening, the sealing element being in contact with the stiff tube; and
- an element detachably connected to the male coupling part and slidably attached to the stiff tube, the element having an opening allowing relative axial displacement between the male coupling part and the stiff tube, and the attachment means being movable within the opening.

2. The assembly according to claim 1, wherein the opening of the element is circumferentially around the stiff tube, and an axial length of the opening corresponds to the relative axial displacement of the male coupling part.

3. The assembly according to claim 1, wherein the detachable connection is made with a screw connection, and the screw connection allows a further relative axial displacement between the stiff tube and the male coupling part.

4. The assembly according to claim 3, wherein a first thread of the screw connection on the male coupling part and a second thread of the screw connection on the element have each a section free of thread before and/or after the first thread and the second thread.

5. The assembly according to claim 1, wherein the attachment means is a circumferential extension around the stiff tube extending radially within the opening.

6. The assembly according to claim 1, wherein the sealing element is in contact with the stiff tube during coupling and un-coupling of the male coupling part with a female coupling part.

7. The coupling according to claim 1, wherein the male coupling part comprises a circumferential axial groove, and a ring slidably around and inside the circumferential axial groove.

8. The assembly according to claim 1, wherein the element is axially slidably on the stiff tube by the attachment means being arranged within the opening with axial stops between an end of the male coupling part and a flange of the element.

9. The assembly according to claim 1, wherein the assembly further comprises a second attachment means, a second male coupling part, and a second element correspondingly arranged on the opposite end of the stiff tube.

10. A method for coupling and un-coupling an assembly of a male coupling part and a stiff tube to a female coupling part, the assembly comprising the stiff tube having an attachment means, the male coupling part requiring a relative axial displacement between the male coupling part and the stiff tube for connecting to a female coupling part, the male coupling part comprising an axial through opening, and an element detachably connected to the male coupling part and slidably attached to the stiff tube, the element having an opening allowing relative axial displacement between the male coupling part and the stiff tube, and the attachment means being movable within the opening, the method comprising:
- coupling by:
  - sliding the male coupling part and the element relative to the stiff tube until the attachment means contacts the end of the male coupling part; and
  - inserting the male coupling part into the female coupling part while not axially moving the stiff tube; and
- un-coupling by:
  - axially move the male coupling part further into the female coupling part while the element is axially stationary with the stiff tube; and removing the assembly by sliding the male coupling part and the element relative to the stiff tube until the attachment means contacts the end of the male coupling part.

11. The method according to claim 10, the first step of un-coupling is to remove a stop to allow the male coupling part to be inserted further into the female coupling part.

12. The method according to claim 10, wherein the step of axially moving the male coupling part further into the female coupling part while the element is axially stationary with the stiff tube, further comprises rotating the male coupling part relatively to the element.

13. The method according to claim 10, wherein the step of removing the assembly by sliding the male coupling part and the element relative to the stiff tube until the attachment means contacts the end of the male coupling part, further comprises rotating the male coupling part relatively to the element.

14. The method according to claim 10, wherein the coupling or the un-coupling is done for a stiff tube with an attachment means, a male coupling part, and an element at each side of the stiff tube.

* * * * *